United States Patent
Tambe et al.

(10) Patent No.: US 8,224,681 B2
(45) Date of Patent: *Jul. 17, 2012

(54) OPTIMIZING A SECURITY PATROLLING STRATEGY USING DECOMPOSED OPTIMAL BAYESIAN STACKELBERG SOLVER

(75) Inventors: Milind Tambe, Rancho Palos Verdes, CA (US); Praveen Paruchuri, Pittsburgh, PA (US); Fernando Ordóñez, Van Nuys, CA (US); Sarit Kraus, Givat Shemuel (IL); Jonathan Pearce, New York, NY (US); Janusz Marecki, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/253,695

(22) Filed: Oct. 17, 2008

(65) Prior Publication Data

US 2009/0099987 A1    Apr. 16, 2009

Related U.S. Application Data

(63) Continuation-in-part of application No. 12/251,766, filed on Oct. 15, 2008.

(60) Provisional application No. 60/980,128, filed on Oct. 15, 2007, provisional application No. 60/980,739, filed on Oct. 17, 2007.

(51) Int. Cl.
*G06Q 10/00*    (2012.01)
*G06G 7/48*    (2006.01)

(52) U.S. Cl. .......................................... 705/7.11; 703/2

(58) Field of Classification Search ................ 705/7.11; 703/2

See application file for complete search history.

(56) References Cited

U.S. PATENT DOCUMENTS

| | | | |
|---|---|---|---|
| 6,731,998 B2 * | 5/2004 | Walser et al. ................ 700/99 |
| 6,836,689 B2 * | 12/2004 | Walser et al. ................ 700/100 |
| 7,315,801 B1 * | 1/2008 | Dowd et al. ................... 703/13 |
| 2010/0114541 A1 * | 5/2010 | Johnson ............................ 703/2 |

OTHER PUBLICATIONS

Shanbhag, Vinayak (Uday) V. (2006). Decomposition and sampling methods for stochastic equilibrium problems. Ph.D. dissertation, Stanford University, United States—California. Retrieved Jun. 18, 2011, from ABI/INFORM Global.(Publication No. AAT 3197509).*

(Continued)

*Primary Examiner* — Beth V Boswell
*Assistant Examiner* — Folashade Anderson
(74) *Attorney, Agent, or Firm* — McDermott Will & Emery LLP

(57) ABSTRACT

Techniques are described for Stackelberg games, in which one agent (the leader) must commit to a strategy that can be observed by other agents (the followers or adversaries) before they choose their own strategies, in which the leader is uncertain about the types of adversaries it may face. Such games are important in security domains, where, for example, a security agent (leader) must commit to a strategy of patrolling certain areas, and robbers (followers) have a chance to observe this strategy over time before choosing their own strategies of where to attack. An efficient exact algorithm is described for finding the optimal strategy for the leader to commit to in these games. This algorithm, Decomposed Optimal Bayesian Stackelberg Solver or "DOBSS," is based on a novel and compact mixed-integer linear programming formulation. The algorithm can be implemented in a method, software, and/or system including computer or processor functionality.

34 Claims, 5 Drawing Sheets

OTHER PUBLICATIONS

R Wolfler Calvo, & R Cordone. (2003). A heuristic approach to the overnight security service problem. Computers & Operations Research, 30(9), 1269-1287. Retrieved Jun. 18, 2011, from ABI/INFORM Global.*

Decentralized Stackelberg Strategies for Interconnected Stochastic Dynamic Systems by Glankwamdee, Suvalai Pratishthananda, Ph.D., University of Illinois at Urbana-Champaign, 1977, 102 pages; AAT 7804000.*

Chang, Tsu-Shuan. "On the Decomposition and Coordination of Large Scale Dynamic Control Problems." Proceedings on 24th Conference on Decision and Control. Ft. Lauderdale, FL, IEEE. 1985. 1484-1485.*

Brown, Gerald. Operations Research Center at MIT: presented at the INFORMS Annual Meeting, Nov. 13-16, 2005. Tutorials Operation Research Informs, 2005. 102-123.*

Paruchuri, Praveen. "Efficient Algorithms to Solve Bayesian Stackelberg Games for Security Applications." Twenty-Third AAAI Conference on Artifical Intelligence. Association for the Advancement of Artificial Intelligence. 2008. 1559-1562.*

Paruchuri, Praveen. "Security in Multiagent Systems by Policy Randonmization." AAMAS'06 Hakodate, Hokkaido, Japan. (2006): Print.*

Medanic, J. Multileve Stackelberg Strategies in Linear-Quadratic Systems. 23. Plemum Publishing Corporation, 1978. 485-497. Print.*

Paruchuri, Praveen and Pearce, Jonathan. (2007). An Efficient Heuristic for Security Against Multiple Adversaries in Stackelberg Games. American Association for Artificial Intelligence.*

Paruchuri, Praveen; Pearce, Jonathan and Kraus (unknown). Playing Games for Security: An Efficient Exact Algorithm for Solving Bayesian Stackelberg Games. University of Waterloo.*

Conitizer et al. Computing the Optimal Strategy to Commit to, 7th ACM Conference on Electronic Commerce, 2006, 82-90.

Harsanyi et al, A Generalized Nash Solution for Two-Person Bargaining Games with Incomplete Information, Management Science, 1972, 18(5):80-106.

Sandholm et al. Mixed-Integer Programming Methods for Finding Nash Equilibria, AAAI, 2005, 495-501.

* cited by examiner

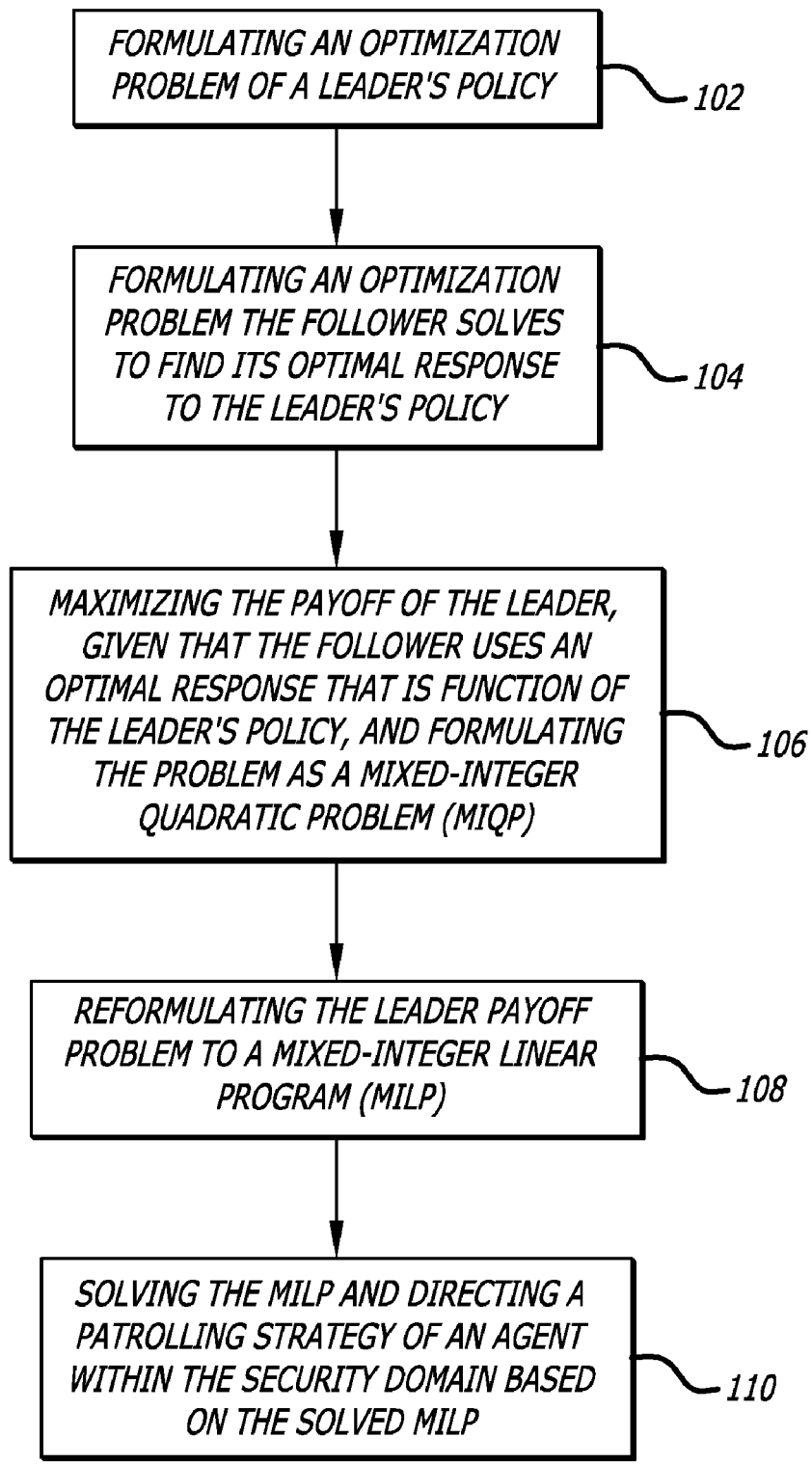

FIG. 2

202 — THE LEADER FOLLOWING A SOLUTION TO THE MIXED INTEGER QUADRATIC PROBLEM (MIQP)

$$\max \sum_{i \in N} \sum_{j \in Q} R_{ij} q(x)_j x_i \quad \text{or} \quad \max \sum_{i \in N} \sum_{j \in Q} R_{ij} x_i q_j$$

WITH OPTIMALITY CONDITIONS

204 — THE FOLLOWER RESPONDING TO THE LEADER STRATEGY BASED ON THE LINEAR PROGRAM WITH OPTIMALITY CONDITIONS, $$\max \sum_{j \in Q} \sum_{i \in N} C_{ij} x_i q_j$$

206 — PERFORMING A DECOMPOSITION ON THE MILP TO ALLOW FOR MULTIPLE FOLLOWERS

208 — THE LEADER FOLLOWING A SOLUTION BASED ON THE MIXED-INTEGER QUADRATIC PROGRAM (MIQP) WITH OPTIMALITY CONDITIONS, $$\max_{q,z} \sum_{i \in N} \sum_{l \in L} \sum_{j \in Q} p^l R^l_{ij} x_i q^l_j$$

210 — THE LEADER FOLLOWING A SOLUTION BASED ON THE MIXED-INTEGER LINEAR PROGRAM (MILP) WITH OPTIMALITY CONDITIONS, $$\max_{q,z,a} \sum_{i \in N} \sum_{l \in L} \sum_{j \in Q} p^l R^l_{ij} z^j_{ij}$$

|    | 2 | 3  | 4  | 5   | 6   | 7   |
|----|---|----|----|-----|-----|-----|
| 1  | 0 | 0  | 0  | 0   | 0   | 10  |
| 2  | 0 | 0  | 0  | 0   | 5   | 0   |
| 3  | 0 | 5  | 5  | 15  | 5   | 10  |
| 4  | 0 | 10 | 15 | 20  | 20  | 20  |
| 5  | 0 | 10 | 10 | 10  | 5   | 10  |
| 6  | 0 | 10 | 10 | 10  | 15  | 15  |
| 7  | 0 | 15 | 20 | 15  | 10  | 20  |
| 8  | 0 | 5  | 15 | 10  | 30  | 45  |
| 9  | 0 | 5  | 10 | 15  | 20  | 30* |
| 10 | 5 | 10 | 20 | 5   | 35* | 35* |
| 11 | 0 | 5  | 20 | 10  | 35* | 40* |
| 12 | 0 | 10 | 20 | 10  | 30* | 30* |
| 13 | 0 | 20 | 20 | 25* | 25* | 0*  |
| 14 | 0 | 20 | 20 | 30* | 20* | 20* |

|    | 2        | 3          | 4           |
|----|----------|------------|-------------|
| 1  | 0, 0     | .352, 0    | .059, 11.28 |
| 2  | .005, 0  | .142, 0    | .086, 6.643 |
| 3  | 1.027, 0 | 5.139, 0   | 5.114, 6.52 |
| 4  | .023, 0  | 10.13, 0   | 15.07, 5.96 |
| 5  | .092, 0  | 10.2, 0    | 10.12, 9.21 |
| 6  | .013, 0  | 10.1, 0    | 10.14, na   |
| 7  | .007, 0  | 15.35, 0   | 20.08, na   |
| 8  | .074, 0  | 5.23, 0    | 15.13, na   |
| 9  | .025, 0  | 5.116, na  | 10.19, na   |
| 10 | 5.075, 0 | 10.08, na  | 20.12, na   |
| 11 | .198, 0  | 5.178, na  | 20.12, na   |
| 12 | .491, 0  | 10.1, na   | 20.14, na   |
| 13 | .24, 0   | 20.05, na  | 20.14, na   |
| 14 | .075, 0  | 20.08, na  | 20.13, na   |

OPTIMIZING A SECURITY PATROLLING STRATEGY USING DECOMPOSED OPTIMAL BAYESIAN STACKELBERG SOLVER

RELATED APPLICATIONS

This application is a continuation-in-part of U.S. patent application Ser. No. 12/251,766 filed 15 Oct. 2008, entitled "Agent Security Via Approximate Solvers," which application claims priority to U.S. Provisional Patent Application Ser. No. 60/980,128, entitled "ASAP (Agent Security Via Approximate Policies) Algorithm in an Approximate Solver for Bayesian-Stackelberg Games" filed 15 Oct. 2007 and U.S. Provisional Patent Application Ser. No. 60/980,739, entitled "DOBSS (Decomposed Optimal Bayesian Stackelberg Solver) is an Optimal Algorithm for Solving Stackelberg Games" filed 17 Oct. 2007; furthermore, this application claims the benefit of U.S. Provisional Patent Application Ser. No. 60/980,739, entitled "DOBSS (Decomposed Optimal Bayesian Stackelberg Solver) is an Optimal Algorithm for Solving Stackelberg Games" filed 17 Oct. 2007; the entire contents of all of which applications are incorporated herein by reference.

STATEMENT REGARDING FEDERALLY SPONSORED RESEARCH

This invention was made with government support under Contract No. N00014-05-1-0630 awarded by the Office of Naval Research. The government has certain rights in the invention.

BACKGROUND

In many multiagent domains, agents must act in order to provide security against attacks by adversaries. A common issue that agents face in such security domains is uncertainty about the adversaries they may be facing. For example, a security robot may need to make a choice about which areas to patrol, and how often. However, it will not know in advance exactly where a robber will choose to strike. A team of unmanned aerial vehicles ("UAVs") monitoring a region undergoing a humanitarian crisis may also need to choose a patrolling policy. They must make this decision without knowing in advance whether terrorists or other adversaries may be waiting to disrupt the mission at a given location. It may indeed be possible to model the motivations of types of adversaries the agent or agent team is likely to face in order to target these adversaries more closely. However, in both cases, the security robot or UAV team will not know exactly which kinds of adversaries may be active on any given day.

A common approach for choosing a policy for agents in such scenarios is to model the scenarios as Bayesian games. A Bayesian game is a game in which agents may belong to one or more types; the type of an agent determines its possible actions and payoffs. The distribution of adversary types that an agent will face may be known or inferred from historical data. Usually, these games are analyzed according to the solution concept of a Bayes-Nash equilibrium, an extension of the Nash equilibrium for Bayesian games. However, in many settings, a Nash or Bayes-Nash equilibrium is not an appropriate solution concept, since it assumes that the agents' strategies are chosen simultaneously.

In some settings, one player can commit to a strategy before the other players choose their strategies, and by doing so, attain a higher reward than if the strategies were chosen simultaneously. These scenarios are known as Stackelberg games. In a Stackelberg game, a leader commits to a strategy first, and then a follower (or group of followers) selfishly optimize their own rewards, considering the action chosen by the leader. For example, the security agent (leader) may first commit to a mixed strategy for patrolling various areas in order to be unpredictable to the robbers (followers). The robbers, after observing the pattern of patrols over time, can then choose their own strategy of choosing a location to rob.

To see the advantage of being the leader in a Stackelberg game, consider a simple game with the payoff table as shown in Table 1, infra. The leader is the row player and the follower is the column player. Here, the leader's payoff is listed first.

TABLE 1

Payoff table for example normal form game.

|   | c | d |
|---|---|---|
| a | 2, 1 | 4, 0 |
| b | 1, 0 | 3, 2 |

The only Nash equilibrium for this game is when the leader plays 2 and the follower plays 2 which gives the leader a payoff of 2.

However, if the leader commits to a uniform mixed strategy of playing 1 and 2 with equal (0.5) probability, the follower's best response is to play 3 to get an expected payoff of 5 (10 and 0 with equal probability). The leader's payoff would then be 4 (3 and with equal probability). In this case, the leader now has an incentive to deviate and choose a pure strategy of 2 (to get a payoff of 5). However, this would cause the follower to deviate to strategy 2 as well, resulting in the Nash equilibrium. Thus, by committing to a strategy that is observed by the follower, and by avoiding the temptation to deviate, the leader manages to obtain a reward higher than that of the best Nash equilibrium.

Such a Bayesian Stackelberg game may arise in a security domain because for example, when patrolling a region, a security robot may only have uncertain knowledge about different robber types it may face. The problem of choosing an optimal strategy for the leader to commit to in a Bayesian Stackelberg game is analyzed in and found to be NP-hard. This result explains the computational difficulties encountered in solving such games. In particular, methods for finding optimal strategies for non-Bayesian games can be applied to Bayesian Stackelberg games by converting the Bayesian game into a normal-form game by the Harsanyi transformation. However, by transforming the game, the compact structure of the Bayesian game is lost. In addition, methods such as the one outlined in require running a set of multiple linear programs, some of which may be infeasible. If on the other hand, one wishes to compute the highest-reward Nash equilibrium, new methods such as MW-Nash, using mixed-integer linear pro-grams (MILPs) may be used, since the highest-reward Bayes-Nash equilibrium is equivalent to the corresponding Nash equilibrium in the transformed game. However, as stated above the compactness in structure of the Bayesian game is lost. In addition, since the Nash equilibrium assumes a simultaneous choice of strategies, the advantages of being the leader are not considered.

The problem of choosing an optimal strategy for the leader to commit to in a Stackelberg game is analyzed in and found to be NP-hard in the case of a Bayesian game with multiple types of followers. Thus, efficient heuristic techniques for choosing high-reward strategies in these games is an important open issue. Methods for finding optimal leader strategies for non-Bayesian games can be applied to this problem by converting the Bayesian game into a normal-form game by the Harsanyi transformation. If, on the other hand, one wishes to compute the highest-reward Nash equilibrium, new methods using mixed-integer linear programs (MILPs) may be used, since the highest-reward Bayes-Nash equilibrium is equivalent to the corresponding Nash equilibrium in the transformed game. However, by transforming the game, the compact structure of the Bayesian game is lost. In addition, since the Nash equilibrium assumes a simultaneous choice of strategies, the advantages of being the leader are not considered.

Thus, finding more efficient and compact techniques for choosing the optimal strategies for the Bayesian Stackelberg games is an important open issue.

Bayesian Games

A Bayesian game contains a set of N agents, and each agent n must be one of a given set of types $\theta_n$. For our patrolling domain, two agents may be present, the security agent and the robber. $\theta_1$ is the set of security agent types and $\theta_2$ is the set of robber types. Since there is only one type of security agent, $\theta_1$ contains only one element. During the game, the robber knows its type but the security agent does not know the robber's type. For each agent (the security agent or the robber) n, there is a set of strategies $\sigma_n$ and a utility function $u_n$: $\theta_1 \times \theta_2 \times \sigma_1 \times \sigma_2 \rightarrow \Re$.

A Bayesian game can be transformed into a normal-form game using the Harsanyi transformation, as described in J. C. Harsanyi and R. Selten, "A generalized Nash solution for two-person bargaining games with incomplete information," Management Science, 18(5):80-106, 1972; the entire contents of which are incorporated herein by reference. Once this is done, linear-program (LP)-based methods for finding high-reward strategies for normal-form games can be used to find a strategy in the transformed game; this strategy can then be used for the Bayesian game.

Given that the Harsanyi transformation is a standard concept in game theory, its key properties when applying to Bayesian Stackelberg games are briefly described without detailing the actual transformation. Using the Harsanyi technique involves introducing a chance hole, that determines the follower's type, thus transforming the leader's incomplete information regarding the follower into imperfect information. The resulting normal-form game matrix generated by the transformation contains the same set of possible actions for the leader as in the original game. However, the set of possible actions for the follower is the cross product of each follower type's set of possible actions. In other words, using the Harsanyi transformation on the Bayesian Stackelberg games, results are considered in a normal-form game with the same number of rows as there are leader actions; however the number of columns has increased exponentially, since every combination of actions taken by each follower type is considered as one possible action for the follower in the transformed game.

What is desirable, therefore, are devices and techniques that address such limitations described for the prior art.

SUMMARY

Embodiments of the present disclosure focus on the problem of determining the optimal strategy for a leader to commit to in a Bayesian-Stackelberg game, i.e. a Stackelberg game where the leader may face one of multiple follower types.

Aspects/embodiments of the present disclosure focus on Bayesian Stackelberg games in service of agents deployed for security domains. In particular, efficient exact methods (which can be referred to as Decomposed Optimal Bayesian Stackelberg Solver, or "DOBSS") are disclosed for finding the optimal leader strategy for security domains. These methods can provide three key advantages. First, the methods can allow for a Bayesian game to be expressed compactly without requiring conversion to a normal-form game via the Harsanyi transformation. Second, the methods require only one mixed-integer linear program (MILP) to be solved, rather than a set of linear programs, thus leading to a further performance improvement. Third, the methods directly search for an optimal leader strategy, rather than a Nash (or Bayes-Nash) equilibrium, thus allowing it to find high-reward non-equilibrium strategies (thus exploiting the advantage of being the leader).

Embodiments of the present disclosure can be implemented in hardware, software, firmware, or any combinations of such, and over one or more networks.

Other features and advantages of the present disclosure will be understood upon reading and understanding the detailed description of exemplary embodiments, described herein, in conjunction with reference to the drawings.

BRIEF DESCRIPTION OF DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 1 depicts a method, in accordance with exemplary embodiments of the present disclosure;

FIG. 2 depicts a further method of an exemplary embodiment of the present disclosure;

FIG. 5 depicts a further set of experimental results, in accordance with exemplary embodiments of the present disclosure; and FIG. 6 depicts a table showing the quality loss averaged over 20 instances, expressed as a percent loss from the optimal solution provided by a DOBSS embodiment, for an ASAP embodiment and a MIP-Nash procedure.

Figure 3:
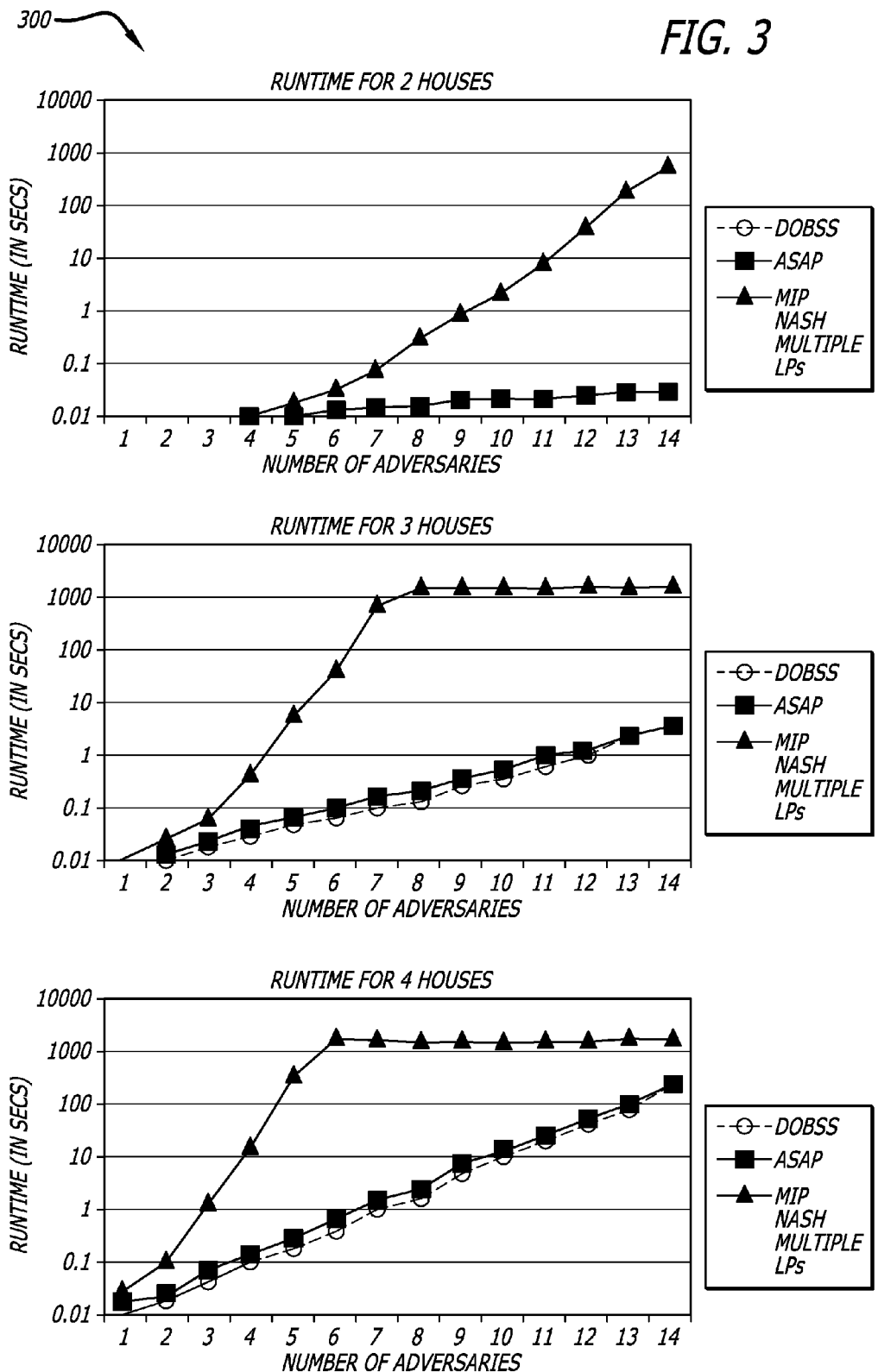
FIG. 3 depicts graphs comparing a DOBSS embodiment, a ASAP embodiments a multiple-LPs method, and a MiP-Nash method with respect to runtime.

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Embodiments of the present disclosure are directed to techniques applicable to Stackelberg games in which one agent (the leader) must commit to a strategy that can be observed by other agents (followers or adversaries) before they choose their own strategies. In such games and the analogous real-world settings, the leader may be uncertain about the types of adversaries they may face. Such games are important in security domains, where, for example, a security agent (leader) must commit to a strategy of patrolling certain areas, and robbers (followers) have a chance to observe this strategy over time before choosing their own strategies of where to attack. Embodiment/aspects are described that can provide an efficient exact algorithm for finding the optimal strategy for the leader to commit to in these games. This algorithm, which can be referred to as a Decomposed Optimal Bayesian Stackelberg Solver or "DOBSS," is based on a novel and compact mixed-integer linear programming formulation described below.

One major advantage of the DOBSS approach is that it operates directly on the compact Bayesian representation, in particular, it exploits the independence of the different follower types to obtain a decomposition scheme, in order to ex-plain the DOBSS approach in stages, in the following subsections, we first define the problem in its most intuitive form as a mixed-integer quadratic program (MIQP), and then show how this problem can be decomposed and then finally show its conversion into an MILP. The model we propose explicitly represents the actions by agent and adversary in the problem solved by the agent, which includes optimality conditions for the adversary's actions.

It may be noted that for a single follower type, one would simply take the mixed strategy for the leader that gives the highest payoff when the follower plays a reward-maximizing strategy. One need only consider the reward-maximizing pure strategies of the followers, since for a given fixed strategy x of the leader, each follower type faces a problem with fixed linear rewards. If a mixed strategy is optimal for the follower, then so are all the pure strategies in the support of that mixed strategy.

Mixed-Integer Quadratic Program

For the case of a single follower, for example, the leader could be the row player and the follower the column player. The leader's policy can be denoted by x, which consists of a vector of the leader's pure strategies. The value $x_i$ is the proportion of times in which pure strategy i is used in the policy. Similarly, q denotes the vector of strategics of the follower. X and Q can denote the index sets of the leader and follower's pure strategies, respectively. The payoff matrices R and C are defined such that $R_{ij}$ is the reward of the leader and $C_{ij}$ is the reward of the follower when the leader takes pure strategy i and the follower takes pure strategy j.

The policy of the leader can be fixed to some policy x. The optimization problem the follower solves to find its optimal response to x can be formulated as the following linear program:

$$\max \sum_{j \in Q} \sum_{i \in \aleph} C_{ij} x_i q_j \quad \text{(Eq. 1)}$$

$$\text{s.t.} \sum_{j \in Q} q_j = 1$$

$$q \geq 0.$$

The objective function maximizes the follower's expected reward given x, while the constraints make feasible any mixed strategy q for the follower. It is straightforward that it is optimal to set $q_j = 1$ for a j which has a maximal value of $$\sum_{i \in \aleph} C_{ij} x_{ij}.$$

This is also evident from the dual problem, given by $$\min a \quad \text{(Eq. 2)}$$

$$\text{s.t.} \ a \geq \sum_{i \in \aleph} C_{ij} x_i, \ j \in Q,$$

which by LP duality has the same optimal solution value. Linear programming optimality conditions characterize the optimal solutions to the follower's problem. These conditions are: primal feasibility constraints in Eq. 1; and dual feasibility constraints in Eq. 2, and complementary slackness:

$$q_j \left( a - \sum_{i \in \aleph} C_{ij} x_i \right) = 0, \ j \in Q.$$

These conditions show that the follower's maximum reward value, a, is the value obtained for every pure strategy with $q_j > 0$, i.e. in the support of the optimal mixed strategy. Therefore each of these pure strategies is optimal. These conditions will be used in the leader's optimization problem to characterize the optimal follower's response. The leader seeks the solution x that maximizes its own payoff, given that the follower uses an optimal response q(.r.). Therefore the leader solves the following problem:

$$\max_i \sum_{i \in \aleph} \sum_{j \in Q} R_{ij} q(x)_j x_i \quad \text{(Eq. 3)}$$

$$\text{s.t.} \sum_{i \in \aleph} x_i = 1$$

$$x_i \in \{0, 1, \ldots, k\}.$$

Eq. 3 maximizes the leader's reward with follower's best response, denoted by vector q(x) for every leader strategy x. For simplicity, one may consider only the pure optimal strategies for the follower, which exist always. In fact, in can be noted that above that, given any optimal mixed strategy q(x), all pure strategies in its support are also optimal. This can allow the optimal pure strategies to be represented using binary variables and helps to linearize the complementary slackness conditions. The leader's problem then becomes:

$$\max_{x,q,a} \sum_{i \in \aleph} \sum_{j \in Q} R_{ij} x_i q_j \quad \text{(Eq. 4)}$$

$$\text{s.t.} \sum_i x_i = k$$

$$\sum_{i \in Q} q_j = 1$$

$$0 \leq \left( a - \sum_{i \in \aleph} C_{ij} x_i \right) \leq (1 - q_j) M$$

$$x_i \in \{0, 1, \ldots, 1\}$$

$$q_i \in \{0, 1\}$$

$$a \in \Re.$$

Here, M is some large constant and a is the follower's maximum reward value as defined in Problem (2). Constraints with free indices mean they are repeated for all values of the index. For example, the next to last constraint means $q_j \in \{0,1\}$ for all $j \in Q$. The first and fourth constraints enforce a feasible mixed policy for the leader, and the second and fifth constraints enforce a feasible pure strategy for the follower. The third constraint enforces dual feasibility of the follower's problem (leftmost inequality) and the complementary slackness constraint for an optimal pure strategy q for the follower (rightmost inequality). In fact, since only one pure strategy can be selected by the follower, say $q_h=1$, this last constraint enforces that $$a = \sum_{i \in N} C_{ih} x_i$$

imposing no additional constraint for all other pure strategies which have $q_j=0$.

It can be noted that Eq. 4 is an integer program with a non-convex quadratic objective. There are two challenges in Eq. 4 when applied to Harsanyi transformed game given multiple follower types: the potential large number of joint actions of the adversaries and the nonlinear objective function. It is shown below how this formulation can be decomposed to handle multiple follower types without requiring the Harsanyi transformation. An explanation follows on how to linearize the objective function using a change of variable.

Decomposed MIQP

The MIQP developed in the previous section handles only one follower. To extend this Stackelberg model to handle multiple follower types we follow a Bayesian approach and assume that there is an a priori probability $p^l$ that a follower of type l will appear, with L denoting the set of follower types. The notation defined in the previous section can be adapted to reason about multiple follower types. For this, x can denote the vector of strategies of the leader and $q^l$ the vector of strategies of follower $l \in L$. X and Q can denote the index sets of leader and follower l's pure strategies, respectively. The payoff matrices of the leader and each of the followers l can be indexed by the matrices $R^l$ and $C^l$. Using this modified notation, the optimal solution of follower l's problem, given the leader's policy x, can be characterized with the LP optimality conditions:

$$\sum_{j \in Q} q_j^l = 1$$

$$a^l - \sum_{i \in N} C_{ij}^l x_i \geq 0$$

$$q_j^l \left( a^l - \sum_{i \in N} C_{ij}^l x_i \right) = 0$$

$$q_j^l \geq 0$$

Again, considering only optimal pure strategies for follower l's problem, the complementarity constraint above can be linearized. These constraints can be incorporated on the leader's problem that selects the optimal policy. Therefore, given a priori probabilities $p^l$, with $l \in L$ of facing each follower, the leader solves the following problem:

$$\max_{x,q,a} \sum_{i \in N} \sum_{l \in L} \sum_{j \in Q} p^l R_{ij}^l x_i q_j^l \quad \text{(Eq. 5)}$$

-continued $$\text{s.t.} \sum_i x_i = 1$$

$$\sum_{j \in Q} q_j^l = 1$$

$$0 \leq \left( a^l - \sum_{i \in N} C_{ij}^l x_i \right) \leq (1 - q_j^l) M$$

$$x_i \in \{0, 1, \ldots, 1\}$$

$$q_i^l \in \{0, 1\}$$

$$a \in \Re.$$

Eq. 5 is a decomposed MIQP in the sense that it does not utilize a full-blown Harsanyi transformation; in particular, it essentially solves multiple smaller problems using individual adversaries' payoffs (hence payoffs indexed by i) rather than a single, large, Harsanyi-transformed payoff matrix formed from the cross-product of actions of each follower type.

However, does this decomposition cause any suboptimality? The answer is no. It will now be shown that Eq. 5 above is equivalent to Eq. 4 with the payoff matrix from the Harsanyi transformation for a Bayesian Stackelberg game (i.e., problem without de-composition). By equivalent it is meant that optimal solution values are the same and that an optimal solution to Eq. 5 leads to an optimal solution to Eq. 4 and vice-versa.

The Harsanyi transformation determines the follower's type according to a given a priori probabilities $p^l$. For the leader it is as if there is a single follower, whose action set is the cross product of the actions of every follower type. Each action j of the follower in the Harsanyi transformed game corresponds to a vector of actions $(j_l, \ldots j_{|L|})$ in the decomposed game, one action for each follower type. These corresponding actions can be referred to by the pure strategies that take them, e.g., a pure strategy q in the Harsanyi game that has $q_j=1$ and $q_h=0$ for all $h \neq j$ and one pure strategy $q^l$ for each opponent type l that has $q_{jl}^l=1$ and $q_h^l=0$ for all $h \neq j_l$. Therefore a Harsanyi pure strategy corresponds to a vector of decomposed pure strategies when their respective actions correspond to each other. The rewards related to these actions have to be weighted by the probabilities of occurrence of each follower. Thus, the reward matrices for the Harsanyi transformation are constructed from the individual reward matrices as follows:

$$R_{ij} = \sum_{l \in L} p^l P_{ij}^l \text{ and } C_{ij} = \sum_{l \in L} p^l C_{ij}^l. \quad \text{(Eq. 6)}$$

PROPOSITION 1. Eq. 5 for a Bayesian game with multiple follower types is equivalent to Eq. 4 on the payoff matrices, given by the Harsanyi transformation according to Eq. 6.

Proof: To show the equivalence it can be shows that a feasible solution to Eq. 5 leads to a feasible solution to Eq. 4 of same objective value or better and vice-versa. This implies the equality in optimal objective value and the correspondence between optimal solutions.

Consider x, $q^l$, $a^l$ with $l \in L$ a feasible solution to Eq. 5. A feasible solution to Eq. 4 is constructed. From its second constraint and integrality of q we have that for every l there is exactly one $j_l$ such that $q_{jl}^l=1$. Let j be the Harsanyi action that corresponds to $(j_1, \ldots, j_{|L|})$ and let q be its pure strategy (i.e., q is a strategy in the transformed game where $q_j=1$, and $q_h=0$ for all other ($h \neq j$). It can be shown that the objectives are equal for these corresponding actions, in particular:

$$\sum_{i \in N} \sum_{l \in L} p^l x_i \sum_{h \in Q} R_{ih}^l q_h^l = \sum_{i \in N} x_i \sum_{l \in L} p^l R_{ijl}^l \quad 5$$

$$= \sum_{i \in N} x_i R_{ij}$$

$$= \sum_{i \in N} \sum_{h \in Q} x_i R_{ih} q_h$$

So now it just remains to be shown that x, q, and $a = \sum_{l \in L} p^l a^l$ is feasible for Eq. 4. Constraints 1, 2, 4, and 5 in Eq. 4 are easily satisfied by the proposed solution. Constraint 3 in Eq. 5 means that $\sum_{i \in X} x_i C_{ijl}^l \geq \sum_{i \in X} x_i C_{ih}^l$ for every $h \in J$ and $l \in L$, leading to $$\sum_{i \in N} x_i C_{ij} = \sum_{l \in L} p^l \sum_{i \in N} x_i C_{ijl}^l \geq \sum_{l \in L} p^l \sum_{i \in N} x_i C_{ihl}^l = \sum_{i \in N} x_i C_{ih},$$

for any pure strategy $h_1, \ldots, h_{|L|}$ for each of the followers and h' its corresponding pure strategy in the Harsanyi game. This part can be concluded by showing that $$\sum_{i \in N} x_i C_{ij} = \sum_{l \in L} p^l \sum_{i \in N} x_i C_{ijl}^l = \sum_{l \in L} p^l a^l = a$$

Now, (x, q, a) can be considered feasible for Eq. 4. This means that $q_j = 1$ for some pure action j. Let $(j_1, \ldots, j_{|L|})$ be the corresponding actions for each follower l. It can be shows that x, q' with $q_{jl}^l = 1$ and $q_{jl}^l = 0$ for $h \neq j_l$, and $a^l = \sum_{i \in X} T_i C_{ijl}^l$ with $l \in L$ is feasible for Eq. 5. By construction this solution satisfies constraints 1, 2, 4, 5 and has a matching objective function. It can now be shows that constraint 3 holds by showing that $\sum_{i \in X} x_i C_{ijl}^l \geq \sum_{i \in X} x_i C_{ih}^l$ for all $h \in Q$ and $l \in L$. For proof by contradiction, it can be assumed that there is an $\hat{h} \in L$ and $\hat{h} \in Q$ such that $$\sum_{i \in X} x_i C_{ij_{\hat{l}}}^{\hat{l}} < \sum_{i \in X} x_i C_{i\hat{h}}^{\hat{l}}.$$

Then by multiplying by $p^l$ and adding $\sum_{l \neq \hat{l}} p^l \sum_{i \in X} x_i C_{ijl}^l$ to both sides of the inequality we obtain The right hand side equals $\sum_{i \in X} x_i C_{ih}$ for the pure strategy h that corresponds to $(j_1, \ldots, \hat{h}, \ldots, j_{|L|})$, which is a contradiction since constraint 3 of Eq. 4 implies that $\sum_{i \in X} x_i C_{ij} \geq \sum_{i \in X} x_i C_{ih}$ for all h.

Arriving at DOBSS: Decomposed MILP

Another objective for the DOBSS algorithm is eliminating non-linearity of the objective function in the MIQP to generate a MILP. The quadratic programming of Eq. 5 can be linearized through the change of variables $z_{ij}^l = x_i q_j^l$, obtaining the following problem:

$$\text{Max}_{s,q,a} \sum_{i \in N} \sum_{l \in L} \sum_{j \in Q} p^l R_{ij}^l z_{ij}^l \quad \text{(Eq. 7)}$$

-continued s.t.

$$\sum_{i \in N} \sum_{j \in Q} z_{ij}^l = 1$$

$$\sum_{j \in Q} z_{ij}^l \leq 1$$

$$q_j^l \leq \sum_{i \in N} z_{ij}^l \leq 1$$

$$\sum_{j \in Q} q_j^l = 1$$

$$0 \leq \left( a^l - \sum_{i \in N} C_{ij}^l x_i \left( \sum_{h \in Q} z_{ih}^l \right) \right) \leq (1 - q_j^l) M$$

$$\sum_{i \in Q} z_{ij}^l = \sum_{j \in Q} z_{ij}^l$$

$$z_{ij}^l \in \{0, \ldots, 1\}$$

$$q_j^l \in \{0, 1\}$$

$$a \in \mathfrak{R}.$$

PROPOSITION 2. Eq. 5 and Eq. 7 are equivalent.

Proof: Consider x, $q^l$, $a^l$ with $l \in L$ a feasible solution of (5). It can be shown that $q^l, a^l, z_{ij}^{l=x} q_j^l$ is a feasible solution of Eq. 7 of same objective function value. The equivalence of the objective functions, and constraints 4, 7 and 8 of Eq. 7 are satisfied by construction. The fact that $\sum_{j \in Q} z_{ij}^l = x_i$ as $\sum_{j \in Q} q_j^l = 1$ explains constraints 1, 2, 5 and 6 of Eq. 7. Constraint 3 of Eq. 7 is satisfied be cause $\sum_{i \in X} z_{ij}^l = q_j^l$.

It can be considered that $q^l, z^l, a^l$ are feasible for Eq. 7. It can be shown that $q^l, a^l$ and $x^l = \sum_{j \in Q} z_{ij}^l$ are feasible for Eq. 5 with the same objective value. In fact all constraints of Eq. 5 are readily satisfied by construction. To see that the objectives match, notice for each $l$ one $q_j^l$ must equal 1 and the rest equal 0. Supposing that $q_{jl}^l = 1$, then the third constraint in Eq. 7 implies that $\sum_{i \in x} z_{ij_l}^l = 1$. This condition and the first constraint in Eq. 8 give that $z_{ij}^l = 0$ for all $i \in x$ and all $j \neq j_l$ ... In particular this implies that $$x_i = \sum_{j \in Q} z_{ij}^1 = z_{ij1}^l = z_{ijl}^l,$$

the last equality from constraint 6 of Eq. 7. Therefore $x_i q_j^l = z_{ijl}^l q_j^l = z_{ij}^l$. This last equality is because both are 0 when $j \neq j_l$ (and $q_j^l = 1$ when $j = j_l$). This shows that the transformation preserves the objective function value, completing the proof.

This equivalent linear integer program can be solved with efficient integer programming (software) packages which can handle problems with thousands of integer variables. The de-composed MILP was implemented and the results are shown in the next section.

A brief description is presented, below, of the computational savings provided by DOBSS method according to the present disclosure. For comparison, the complexity of a DOBSS embodiment is compared with the competing exact solution approach, namely the Multiple-LPs method described in V. Conitzer and T. Sanholm, "Computing the optimal strategy to commit to," in ACM Conference on Electronic Commerce, 2006; the entire contents of which are incorporated herein by reference.

The resulting comparison shows that the DOBSS method achieves an exponential reduction in the problem that must be solved over the multiple-LPs approach due to the following reasons: the multiple-LPs method solves an LP over the exponentially blown Harsanyi transformed matrix for each joint strategy of the adversaries (also exponential in number). In contrast, DOBSS solves a problem that has one integer variable per strategy for every adversary. In the proposition below a comparison is made of the work necessary in these two methods.

PROPOSITION 3. The DOBSS procedure exponentially reduces the problem over the Multiple-LPs approach as the number of adversaries increases.

Proof Sketch Let X be the number of agent actions, Q the number of adversary actions and L the number of adversaries. The DOBSS procedure (algorithm) solves a MIP with XQL continuous variables, QL binary variables, and 4QL+2XL+2L constraints. The size of this MIP then is O(XQL) and the number of feasible integer solutions is QL, due to constraint 4 in Eq. 7. Solving this problem with a judicious branch and bound procedure will lead in the worst case to a tree with $O(Q^L)$ nodes each requiring the solution of an LP of size O(XQL). For this situation, the size of an LP is the number of variables+number of constraints.

On the other hand the multiple-LPs method needs the Harsanyi transformation. The Harsanyi transformation leads to a game where the agent can take X actions and the joint adversary can take $Q^L$ actions. This method then solves exactly $Q^L$ different LPs, each with X variables and $Q^L$ constraints, i.e. each LP is of size $O(X+Q^L)$.

In summary the total work for DOBSS in the worst case is $O(Q^L XQL)$, given by the number of problems times the size of LPs solved, while the work of the Multiple-LPs method is exactly $O(Q^L(X+Q^L))$. This means that there is an $O(Q^L)$ reduction in the work done by DOBSS methods. The branch-and-bound procedure seldom explores the entire tree as it uses the bounding procedures to discard sections of the tree which are provably non optimal. The multiple-LPs method on the other hand must solve all QL problems.

With the foregoing equations in mind, a basic embodiment of an DOBSS method (algorithm) is depicted in FIG. 1. As shown, DOBSS method 100 can include fixing the policy of a leader for taking action in a security domain, as described at 102. An optimization problem can be formulated that the follower solves to find its optimal response to the leader's policy, as described at 104. Maximizing the payoff of the leader can take place, given that the follower uses an optimal response that is function of the leader's policy, and the problem can be formulated as mixed-integer quadratic problem (MIQP), as described at 106.

Continuing with the description of method 100, the leader payoff problem can be reformulated to a mixed-integer linear program (MILP), as described at 108. The MILP can then be solved, as described at 110, e.g., with commercial mathematical analysis software such as CPLEX 8.1 (described in further detail, infra). Based on the solution to the MILP, a patrolling strategy (e.g., course over time) of an agent within the patrolling domain can be directed to or calculated for the agent.

Embodiments of the present disclosure can be implemented in hardware, software, firmware, or any combinations of such, and over one or more networks. Suitable hardware can include one or more computer systems (with attendant hardware) or processors configured and arranged to implement ASAP methods/algorithms described herein.

FIG. 2 depicts a further example of a more detailed DOBSS method (algorithm) 200 in accordance with exemplary embodiments of the present disclosure. The leader can follow the mixed integer quadratic problem (MIQP) of the form max $$\sum_{i \in N} \sum_{j \in Q} R_{ij} q(x)_j x_i$$

or max $$\sum_{i \in N} \sum_{j \in Q} R_{ij} x_i q_i$$

with optimality conditions described supra, as described at 202. The follower can respond to the leader's policy by solving an optimization problem of the form max $$\sum_{j \in Q} \sum_{i \in N} C_{ij} x_i q_j$$

with my conditions described supra, as described at 204.

Continuing with the description of method 200, a decomposition can optionally be performed on the formulated MIQP for the patrolling domain to allow for multiple followers (e.g., robbers), as described at 206. Finally, the leader can follow a solution (e.g., patrolling strategy in the security domain or area) based the decomposed MIQP or MILP, such as one of the form max $$\sum_{i \in N} \sum_{l \in L} \sum_{j \in Q} p^l R_{ij}^l x_i q_j^l$$

or max $$\sum_{i \in N} \sum_{l \in L} \sum_{l \in Q} p^l R_{ij}^l z_{ij}^l,$$

respectively, with optimality conditions described supra, as described at 208 and 210.

Experiments

In most security patrolling domains, the security agents (like UAVs or security robots) cannot feasibly patrol all areas all the time. Instead, they must choose a policy by which they patrol various routes at different times, taking into account factors such as the likelihood of crime in different areas, possible targets for crime, and the security agents' own resources (number of security agents, amount of available time, fuel, etc.). It is usually beneficial for this policy to be nondeterministic so that robbers cannot safely rob certain locations, knowing that they will be safe from the security agents. To demonstrate the utility of the DOBSS algorithm, used is a simplified version of such a domain, expressed as a game.

The most basic version of the security domain for the DOBSS algorithm/method consists of two players: the security agent (the leader) and the robber (the follower) in a world consisting of m houses, 1 . . . m. The security agent's set of pure strategies consists of possible routes of d houses to patrol (in some order). The security agent can choose a mixed strategy so that the robber will be unsure of exactly where the security agent may patrol, but the robber will know the mixed strategy the security agent has chosen. For example, the robber can observe over time how often the security agent patrols each area. With this knowledge, the robber must choose a single house to rob. It is assumed that the robber generally takes a long time to rob a house, if the house chosen by the robber is not on the security agent's route, then the robber successfully robs the house. Otherwise, if it is on the security agent's route, then the earlier the house is on the route, the easier it is for the security agent to catch the robber before he finishes robbing it.

The payoffs for this game are modeled with the following variables:

$v_{z,x}$: value of the goods in house z to the security agent.
$v_{z,q}$: value of the goods in house z to the robber.
$c_x$: reward to the security agent of catching the robber.
$c_q$: cost to the robber of getting caught.
$p_z$: probability that the security agent can catch the robber at the zth house in the patrol ($p_z < p_{z'} \Leftrightarrow z' < z$).

The security agent's set of possible pure strategies (patrol routes) is denoted by X and includes all d-tuples $i = <w_1, w_2, \ldots, w_d>$ with $w_1 \ldots w_d = 1 \ldots m$, where no two elements are equal (the agent is not allowed to return to the same house). The robber's set of possible pure strategies (houses to rob) is denoted by Q and includes all integers $j = 1 \ldots m$. The payoffs (security agent, robber) for pure strategies i, j are:

$$-v_{z,x}, v_{z,q}, \text{ for } j = l \epsilon i; \text{ and}$$

$$p_z c_x + (1-p_z)(-v_{z,x}), -p_z c_q + (1-p_z)(v_{z,q}), \text{ for } j = z \epsilon i.$$

With this structure it is possible to model many different types of robbers who have differing motivations; for example, one robber may have a lower cost of getting caught than another, or may value the goods in the various houses differently. To simulate differing types of robbers, a random distribution of varying size was added to the values in the base case. All games can be normalized so that, for each robber type, the minimum and maximum payoffs to the security agent and robber are 0 and 1, respectively.

Experimental Results

Three sets of experiments were performed by the present inventors and pertinent results are described herein with regard to FIGS. 3-6. The first set of experiments compare the runtimes of the following four methods: a DOBSS method embodiment for finding the optimal solution, a ASAP embodiment that provides best policies with limited randomization, a multiple linear programs method that provides optimal policies and the MIP-Nash procedure for finding the best Bayes-Nash equilibrium. The multiple-LPs method and the MiP-Nash procedure require a normal-form game as input, and so the Harsanyi transformation is required as an initial step (the preprocessing time is not indicated here thus giving those other methods an apparent advantage).

For this set of experiments, games were created in worlds of two to seven houses with patrols consisting of two houses, constructing payoff tables as described in the previous subsection. The runtime analysis experiments were divided into two sets: one set of graphs showing runtime results from two, three and fours houses for all the four methods mentioned above and the second set analyzing runtimes of DOBSS and ASAP for five to seven houses since the other two methods were found to be quite slow in these scenarios.

The first set of runtime graphs in FIG. 3 shows a plot 300 of runtime results for all the four methods for two, three and four houses as shown in the three graphs. Each runtime value in the graph(s) corresponds to an average over twenty randomly generated scenarios. The r-axis shows the number of follower types the leader faces starting from 1 to 14 adversaries and the y-axis of the graph shows the runtime in seconds on log-scale ranging from 0.01 to 10000 seconds. The choice of 0.01 to 10000 is for convenience of representation of log scale (with base 10). All the experiments that were not concluded in 30 minutes (1800 seconds) were cut off.

From the runtime graphs, it can be concluded that the DOBSS and ASAP methods outperform the multiple-LPs and MiP-Nash methods with respect to runtime. A maximum of fourteen adversaries were modeled for all our domains. For the domain with two houses, while the MIP-Nash and multiple-LPs method needed about 1000 s for solving the problem with fourteen adversaries, both the DOBSS and ASAP provided solutions in less than 0.1 s. Note that DOBSS provided the optimal solution while ASAP provided the best possible solution with randomization constraints. These randomization constraints were believed to also sometimes cause ASAP to incorrectly claim solutions to be infeasible, the details of which are presented later on in this section. The runtime for ASAP in all results was taken as either the time needed to generate an optimal solution or to determine that no feasible solution exists.

The first graph in FIG. 3 shows the trends for all these four methods. While the runtimes of DOBSS and ASAP show linear increase in runtimes, the other two procedures show an exponential trend. The runtimes of DOBSS and ASAP are themselves exponential since they show a linear increase when plotted on a log-scale graph. Further they have an exponential speedup over the other two procedures as seen in the graph.

The second graph in FIG. 3 presents results for the domain having three houses. Both the MIP-Nash and multiple-LPs could solve this problem only till seven adversaries within the cutoff time of 1800 s whereas DOBSS and ASAP could solve the problem for all the fourteen adversaries modeled under 10 s. (The cutoff of 1800 s is also the reason MIP-Nash and multiple-LPs appear to have a constant run-time beyond seven adversaries.) Similar trends can be observed in the third graph with a domain of four houses where MIPNash and multiple-LPs could solve only until 5 adversaries whereas DOBSS and ASAP could solve till fourteen adversaries within 400 s for DOBSS and 500 s for ASAP. From this set of three graphs, it can be concluded that DOBSS and ASAP outperform the other two procedures, by an exponential margin as predicted in the proof presented, supra.

Between the two fastest methods, DOBSS and ASAP, the DOBSS method runs faster than ASAP in general. To verify this trend, a speedup graph 400 is presented in FIG. 4 for larger problems, e.g., for domains having five, six and seven houses. The x-axis shows the number of adversaries the agent faces and the y-axis represents the speedup obtained by DOBSS over ASAP in percent, i.e., 100-runtime (ASAP–DOBSS)/DOBSS. For example, for the domain with 5 houses and 5 adversaries, the plot shows a speedup of about 95% while for 6 and 7 houses it shows speedups of about 70% and 55% respectively. This implies that if DOBSS needs 100 s to solve the problem and has a speedup of 70%, ASAP would need 170 s to solve the same problem. All these speedups were calculated as an average of the scenarios (out of the 20 modeled for each instance) that generated optimal solutions (or were declared infeasible for ASAP) within the cutoff time of 1800 s. Note that results are presented for only until 12, 9 and 8 adversaries for 5, 6 and 7 houses respectively since almost all the 20 instances cross the cutoff times.

Figure 4:
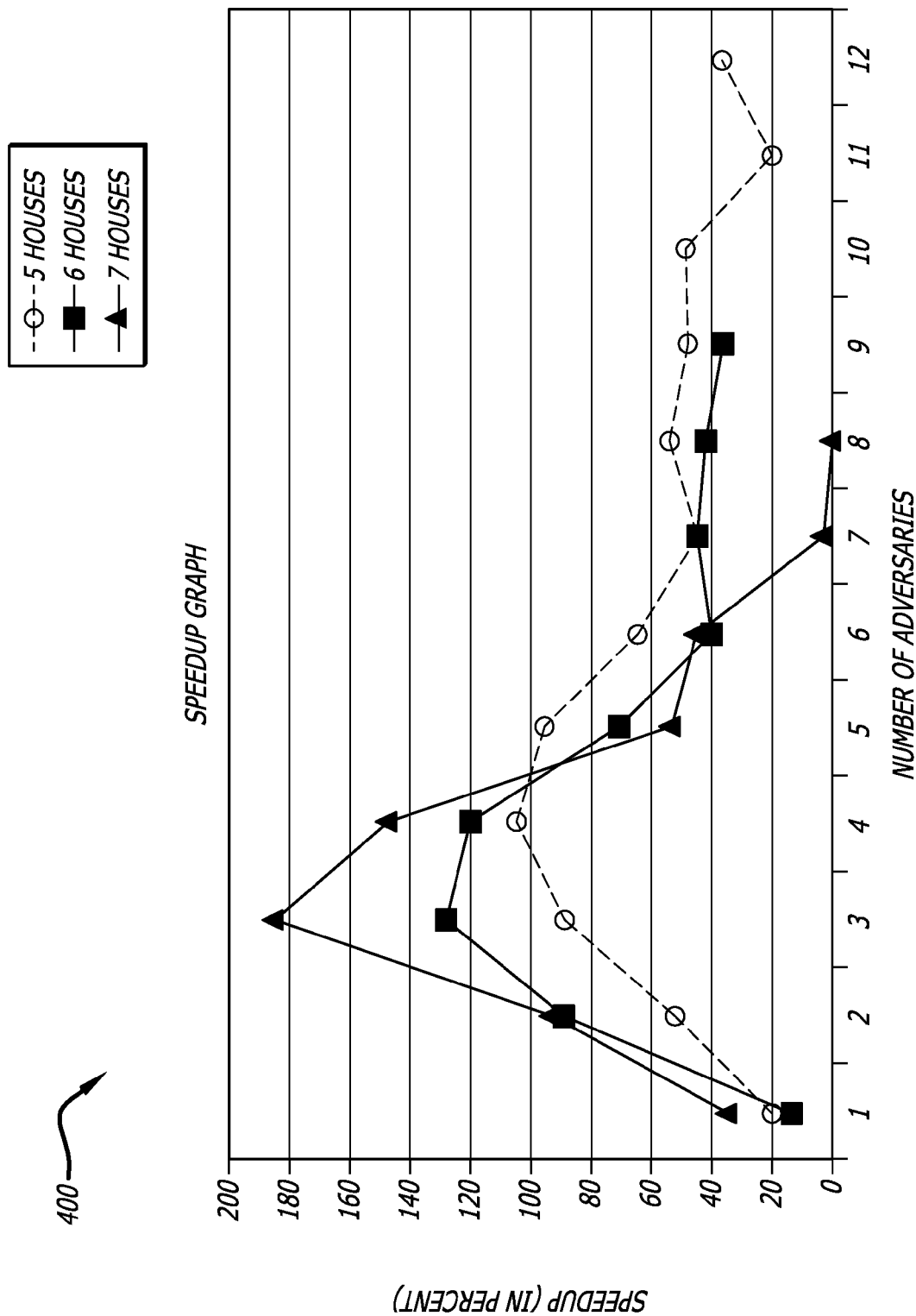
FIG. 4 depicts a speedup graph for larger problems with domains having five, six and seven houses, in accordance with exemplary embodiments of the present disclosure.

From the graph in FIG. 4, it can be obtained/shown that DOBSS has a faster algorithm runtime than ASAP in all the cases since there is always a positive speedup. Further, it may be noticed that the speedups obtained were highest when the number of adversaries are between 2 to 5 and the speedups taper off thereafter. The main reason for this trend is as follows: as the number of adversaries increase, the percent of infeasible solutions generated by ASAP increases (as seen in the table of FIG. 5, described, infra). While DOBSS spends most of its time searching for the optimal solution even if it finds a good solution early-on, ASAP just needs to determine feasibility of the problem whenever it outputs infeasible solutions, hence bringing down the averaged speedups as the number of infeasible solution instances increase—obviously, ASAP is mistakenly determining solutions to be infeasible. Calculating the average speedups over all the adversary scenarios for five, six and seven houses it was found that DOBSS has a 62% average speedup over the ASAP method, i.e., if DOBSS takes 100 s, ASAP would need 162 s on an average. This quantity becomes significant considering the following issues: (a) ASAP procedure generates infeasible solutions significant number of times while DOBSS is always feasible. (b) DOBSS provides the optimal solution whereas ASAP provides the best solution with limited randomization whenever feasible. The next two sets of results focus on the two issues just presented.

A second set of experimental results are introduced in the graph 550 of FIG. 5 to highlight the infeasibility issue. The infeasibility of ASAP is a new result and a significant one given that ASAP is the closest competitor of DOBSS in terms of efficiency—while previous work had just presented the ASAP method, large-scale experiments that have systematically uncovered the issue of infeasibility, in this experiment, the same settings as described above were used. The number of houses was varied between two to seven (columns in the table) and the number of adversary types was varied between one to fourteen (rows in the table). For each fixed number of houses and follower types, twenty scenarios were randomly generated. The ASAP procedure was run and presented the number of infeasible solutions obtained, as a percentage of all the scenarios tested for each of the fixed number of houses and adversary types. For example, with 8 adversaries (row numbered 8) and 4 houses (column numbered 4) scenario, ASAP generates 15% infeasible solutions. Note that for the values marked with a star the percentage presented in the table represents an upper bound on the number of infeasible scenarios.

In these starred scenarios the ASAP procedure ran out of time in many instances. When ASAP ran out of time, it either indicated infeasibility, in which case it was classified as infeasible solution making it an upper hound (since there might be feasible solution when sufficient time is provided); or it indicated that there was a feasible solution even though it has not found the optimal yet, in which case it was obviously not marked as infeasible. The following conclusions about ASAP can be made from the table in FIG. 5: (a) In general, given a fixed number of houses, as the number of adversaries increase (i.e., from 1 to 14) the percent-age of infeasible solutions increase (down the columns). (b) Given a fixed number of adversaries, as the number of houses increase, the percentage of infeasible solutions increase (across the rows).

Although there are exceptions to both the conclusions, the general trend is that as the problem size increases (due to increase in either houses or adversaries or both) ASAP tends to generate more infeasible solutions thus making it unsuitable for bigger problems. From the table it can be seen that more than 12.5% of the solutions are infeasible for the live house problem when averaged over all the adversary scenarios. This number increases to as high as 18% and 20% on an average for the six and seven house problems. If similar calculations are performed over the last live adversary scenarios, i.e., when the number of adversaries are varied from 10 to 14, 16%, 29% and 25% can be obtained, respectively, for the five, six and seven house scenarios. This shows that the ASAP produces more infeasible solutions as the problem size increases. Further, there is no procedure to determine if ASAP will generate a infeasible solution until runtime, thus making the ASAP approach impractical.

The third set of experiments compared the solution quality provided by all the four methods. Both DOBSS and Multiple-LPs procedure provide the optimal solution and hence are considered equivalent. In FIG. 6, a table 600 is presented that shows the quality loss averaged over 20 instances, expressed as a percent loss from the optimal solution (provided by DOBSS), for the ASAP and the MIP-Nash procedures. The averaged results are then presented for all the houses and adversary scenarios as in FIG. 5. The percent loss of quality is defined as $100*\text{quality}(\text{DOBSS}-x)/\text{DOBSS}$, where x is the solution quality of ASAP or MIP-Nash. Each cell (corresponding to a fixed number of houses and columns) contains two numbers. The first number represents the percent of quality loss for ASAP, and the second represents the same for the MIP-Nash procedure. The 'na' in the table indicates that the algorithm was unable to provide any solution in the cutoff time of 1800 s while ASAP generated a solution (feasible or infeasible) in all instances. The quality of infeasible solutions was taken as zero.

As described earlier, for FIG. 6 the rows numbered from 1 to 14 represent the number of adversaries and columns numbered from 2 to 4 represent the number of houses. For example, for 3 houses and 6 adversaries scenario, the quality loss tuple shown in the table is <10.1, 0>. This means that ASAP has a quality loss of 10.1% while MIP-Nash has 0% quality loss. A quality loss of 10.1% would mean that if DOBSS provided a solution of quality 100 units, the solution quality of ASAP would be 89.9 units. From the table the following can be obtained: (a) The quality loss for ASAP is very low for two houses case and increases in general as the number of houses and adversaries increase. The average quality loss was 0.5% over all adversary scenarios for the two house case and increases to 9.1% and 13.3% respectively for three and four houses case. (b) The equilibrium solution provided by the MIP-Nash procedure is also the optimal leader strategy for 2 and 3 houses case; hence the quality loss of 0. The solution quality of the equilibrium is lower than the optimum solution for the four houses case by almost 8% when averaged over all the available data.

From the three sets of experimental results it can be concluded that: DOBSS and ASAP are significantly faster than the other procedures with DOBSS being the fastest method. Further, DOBSS provides a feasible exact solution always while ASAP is a heuristic that may have lower solution quality and also generate infeasible solutions a significant number of times. Hence, in exemplary embodiments, DOBSS, an efficient and exact procedure for solving the Bayesian Stackelberg games, may be preferred.

Accordingly, embodiments of the present disclose can provide new exact methods (called DOBBS) for finding the optimal strategy for the leader in a Bayesian Stackelberg game and can provide various advantages over prior art techniques. In such games, one agent (the leader) must commit to a possibly mixed strategy that can be observed by other agents (the followers) before they choose their own strategies. Such games, in which the leader is uncertain about the types of adversaries it may face, are extremely valuable in modeling domains involving security, including patrolling, setting up checkpoints, network routing, transportation systems and others; and thus solution techniques such as DOBBS for efficiently solving such games are crucial. DOBSS techniques can be orders of magnitude faster than the previously prior art exact methods. DOBSS techniques thus represent a significant advance in the state of the art in addressing security domains.

One key advantage of the DOBSS approach is that it operates directly on the compact Bayesian representation, without requiring the Harsanyi transformation, in particular, DOBBS obtains a decomposition scheme by exploiting the property that the followers are independent of each other. Since the problem is NP-hard, it would not be anticipated that a simple decomposition would be practical. Instead, the key in the DOBBS decomposition scheme is the observation that evaluating the leader strategy against a Harsanyi-transformed game matrix is equivalent to evaluating against each of the game matrices for the individual follower types. This decomposition is analogous to ASAP techniques, which can also operate directly on the untransformed Bayesian game to find a high-quality strategy for the leader; how-ever it generates infeasible solutions as the problem sizes increase and does not guarantee an optimal solution due to controlled randomization. In addition, our experiments show that ASAP can be slower than DOBSS as the number of follower types increases.

DOBBS's provides advantages over its other main competitor, i.e., the prior art multiple LPs method introduced to compute optimal leader strategies for non-Bayesian games. This prior art method faces an exponential explosion when applied to domains of interest in the present disclosure. Furthermore, it is unlikely to be decomposable into a small number of games given that the problem being attacked is NP-hard; DOBSS has the advantage of decomposition, but can work with mixed-integer linear programs (MILPs) rather than LPs. Finally, DOBSS requires solution of only one optimization problem, rather than a series of problems as in the LP method. Additionally, the sequence form (of the prior art) provides an alternative compact representation to normal form representation, and has been shown in games like Poker to provide significant speedups in finding equilibrium solutions over approaches based on normal form representations. Such a representation, however, cannot be directly used in Stackelberg games as described herein. In particular, game models described herein assume that an adversary knows not the specific strategy (e.g., patrolling plan) that an agent will follow, but rather only the agent's mixed strategy. Representing such a commitment to a mixed strategy in a sequence form representation is difficult; it would need to represent all possible mixed strategies in advance. Furthermore, the prior art has not focused on computing optimal response in Stackelberg games, but rather in only finding equilibria.

While certain embodiments have been described herein, it will be understood by one skilled in the art that the methods, systems, and apparatus of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. A method of determining a leader's strategy for a security domain by solving a Stackelberg game, the method comprising:
    formulating using a processor a leader's policy according to a Stackelberg game for a security domain;
    formulating using the processor a linear optimization problem, including a linear objective, that the follower solves to find its optimal response to the leader's policy;
    maximizing the payoff of the leader, given that the follower uses an optimal response that is function of the leader's policy, and formulating the problem as mixed-integer quadratic problem (MIQP);
    performing a decomposition of the MIQP to produce a decomposed MIQP, wherein the decomposition addresses the size of the MIQP;
    reformulating the leader payoff problem by linearizing the decomposed MIQP to form a decomposed mixed-integer linear program (MILP);
    solving using the processor the decomposed MILP; and
    directing a patrolling strategy of an agent within the security domain based on the solved decomposed MILP.

2. The method of claim 1, wherein the optimization problem the $$\sum_{j \in Q} \sum_{i \in N} C_{ij} x_i q_j,$$

follower solves is of the form, wherein the leader is the row player and the follower the column player, the vector of strategies of the leader are denoted by x, q denotes the vector of strategies of the follower, X and Q denote the index sets of the leader and follower's pure strategies, respectively, and the payoff matrix C correspond to $C_{ij}$ that is the reward of the follower when the leader takes pure strategy i and the follower takes pure strategy j.

3. The method of claim 2, wherein the optimization problem is $$\sum_{j \in Q} q_j = 1$$

subject to constraints, and $q \geq 0$.

4. The method of claim 1, wherein maximizing the payoff of the leader comprise solving a non-convex quadratic objective function.

5. The method of claim 2, wherein the MIQP is of the form, max $$\sum_{i \in N} \sum_{j \in Q} R_{ij} q(x) x_i,$$

and wherein the payoff matrix R corresponds to $R_{ij}$, the reward of the leader.

6. The method of claim 5, wherein the MIQP is subject to constraints, $$\sum_{i \in N} x_i = 1$$

and $x_i \in \{0, \ldots, 1\}$.

7. The method of claim 2, wherein the MIQP is of the form, max $$\sum_{i \in N} \sum_{j \in Q} R_{ij} x_i q_j,$$

and wherein the payoff matrix R corresponds to $R_{ij}$, the reward of the leader.

8. The method of claim 7, wherein the MIQP is subject to constraints, $$\sum_i x_i = k,$$

$$\sum_{j \in Q} q_j = 1,$$

$$0 \le \left(a - \sum_{i \in N} C_{ij} x_i\right) \le (1-q_j)M,$$

$$x_i \in \{0, 1, \ldots, 1\}, \text{ and}$$

$$q_i \in \{0, 1\},$$

wherein a is the follower's maximum reward value, and M is a large constant.

9. The method of claim 1, further comprising performing a decomposition for multiple adversaries.

10. The method of claim 9, wherein performing a decomposition comprises constructing a decomposed MIQP of the form, $$\sum_{i \in N} \sum_{l \in L} \sum_{j \in Q} p^l R_{ij}^l x_i q_j^l.$$

11. The method of claim 10, wherein the MIQP is subject to constraints, $$\sum_i x_i = 1,$$

$$\sum_{i \in Q} q_j^l = 1,$$

$$0 \le \left(a^l - \sum_{i \in N} C_{ij}^l x_i\right) \le (1-q_j^l)M,$$

$$x_i \in \{0, 1, \ldots, 1\},$$

$$q_j^l \in \{0, 1\}, \text{ and}$$

$$a \in \Re,$$

wherein a is the follower's maximum reward value, and M is a large constant.

12. The method of claim 9, wherein performing a decomposition comprises constructing a decomposed MILP of the form, $\max_{q,z,a}$ $$\sum_{i \in N} \sum_{l \in L} \sum_{j \in Q} p^l R_{ij}^l z_{ij}^l,$$

wherein $p^l$ is the a priori probability, with $l \in L$, of facing each follower and $z_{ij}^j$ is a change of variables, wherein $z_{ij} = x_i q_j^l$.

13. The method of claim 12, wherein the MILP is subject to constraints, $$\sum_{i \in N} \sum_{j \in Q} z_{ij}^l = 1,$$

$$\sum_{j \in Q} z_{ij}^l \le 1,$$

$$q_j^l \le \sum_{i \in N} z_{ij}^l \le 1,$$

$$\sum_{j \in Q} q_j^l = 1,$$

$$0 \le \left(a^l - \sum_{i \in N} C_{ij}^l x_i \left(\sum_{h \in Q} z_{ih}^l\right)\right) \le (1-q_j^l)M,$$

$$\sum_{i \in Q} z_{ij}^l = \sum_{j \in Q} z_{ij}^l,$$

$$z_{ij}^l \in \{0, \ldots, 1\},$$

$$q_j^l \in \{0, 1\}, \text{ and}$$

$$a \in \Re,$$

wherein a is the follower's maximum reward value, and M is a large constant.

14. The method of claim 1, wherein the agent comprises a robot or unmanned aerial vehicle (UAV).

15. The method of claim 14, wherein the security domain comprises infrastructure to be protected.

16. The method of claim 14, wherein the security domain comprises one or more airport terminals to be protected.

17. A computer-executable program product comprising a computer-readable medium with resident computer-readable instructions, the computer readable instructions comprising instructions for:
  formulating a leader's policy according to a Stackelberg game for a security domain;
  formulating an optimization problem the follower solves to find its optimal response to the leader's policy;
  maximizing the payoff of the leader, given that the follower uses an optimal response that is function of the leader's policy, and formulating the problem as mixed-integer quadratic problem (MIQP);
  performing a decomposition of the MIQP to produce a decomposed MIQP, wherein the decomposition addresses the size of the MIQP;
  reformulating the leader payoff problem by linearizing the decomposed MIQP to form a decomposed mixed-integer linear program (MILP);
  solving the decomposed MILP, wherein the leader's strategy for a security domain can be determined; and
  directing a patrolling strategy of an agent within the security domain based on the solved decomposed MILP.

18. The computer-executable program product of claim 17, wherein the computer-readable instructions comprise an optimization problem the follower solves of the form, $$\sum_{j \in Q} \sum_{i \in N} C_{ij} x_i q_j,$$

wherein the leader is the row player and the follower the column player, the vector of strategies of the leader are denoted by x, q denotes the vector of strategies of the follower, X and Q denote the index sets of the leader and follower's pure strategies, respectively, and the payoff matrix C correspond to $C_{ij}$ that is the reward of the follower when the leader takes pure strategy i and the follower takes pure strategy j.

19. The computer-executable program product of claim 18, wherein the computer-readable instructions including the optimization problem include constraints, $$\sum_{j \in Q} q_j = 1$$

and $q \geq 0$.

20. The computer-executable program product of claim 18, wherein maximizing the payoff of the leader comprise solving a non-convex quadratic objective function.

21. The computer-executable program product of claim 18, wherein the MIQP is of the form, max $$\sum_{i \in N} \sum_{j \in Q} R_{ij} q(x) x_i,$$

and wherein the payoff matrix R corresponds to $R_{ij}$, the reward of the leader.

22. The computer-executable program product of claim 21, wherein the MIQP is subject to constraints, $$\sum_{i \in N} x_i = 1$$

and $x_i \in \{0, \ldots, 1\}$.

23. The computer-executable program product of claim 18, wherein the MIQP is of the form, max $$\sum_{i \in N} \sum_{j \in Q} R_{ij} x_i q_j,$$

and wherein the payoff matrix R corresponds to $R_{ij}$, the reward of the leader.

24. The computer-executable program product of claim 23, wherein the MIQP is subject to constraints, $$\sum_i x_i = k,$$

$$\sum_{i \in Q} q_j = 1,$$

$$0 \leq \left(a - \sum_{i \in N} C_{ij} x_i\right) \leq (1 - q_j)M,$$

$x_i \in \{0, 1, \ldots, 1\}$, and $q_j \in \{0, 1\}$, wherein a is the follower's maximum reward value, and M is a large constant.

25. The computer-executable program product of claim 17, further comprising instructions for performing a decomposition for multiple adversaries.

26. The computer-executable program product of claim 25, wherein performing a decomposition comprises constructing a decomposed MIQP of the form, $$\sum_{i \in N} \sum_{l \in L} \sum_{j \in Q} p^l R_{ij}^l x_i q_j^l.$$

27. The computer-executable program product of claim 26, wherein the MIQP is subject to constraints, $$\sum_i x_i = 1,$$

$$\sum_{j \in Q} q_j^l = 1,$$

$$0 \leq \left(a^l - \sum_{i \in N} C_{ij}^l x_i\right) \leq (1 - q_j^l)M,$$

$x_i \in \{0, 1, \ldots, 1\}$, $q_j^l \in \{0, 1\}$, and $a \in \mathfrak{R}$, wherein a is the follower's maximum reward value, and M is a large constant.

28. The computer-executable program product of claim 25, wherein performing a decomposition comprises constructing a decomposed MILP of the form, $$\sum_{i \in N} \sum_{l \in L} \sum_{j \in Q} p^l R_{ij}^l z_{ij}^l,$$

wherein $p^l$ is the a priori probability, with $l \in L$, of facing each follower and $z_{ij}^j$ is a change of variables, wherein $z_{ij} = x_i q_j^l$.

29. The computer-executable program product of claim 28, wherein the MILP is subject to constraints, $$\sum_{i \in N} \sum_{j \in Q} z_{ij}^l = 1,$$

$$\sum_{j \in Q} z_{ij}^l \leq 1,$$

$$q_j^l \leq \sum_{i \in N} z_{ij}^l \leq 1,$$

$$\sum_{j \in Q} q_j^l = 1,$$

$$0 \leq \left(a^l - \sum_{i \in N} C_{ij}^l x_i \left(\sum_{i \in Q} z_{ih}^l\right)\right) \leq (1 - q_j^l)M,$$

$$\sum_{i \in Q} z_{ij}^l = \sum_{i \in Q} z_{ij}^l,$$

$z_{ij}^l \in \{0, \ldots, 1\}$, $q_j^l \in \{0, 1\}$, and $a \in \mathfrak{R}$, wherein a is the follower's maximum reward value, and M is a large constant.

30. The computer-executable program product of claim 17, further comprising instructions for directing the patrolling of robot of an unmanned aerial vehicle (UAV) based on the solved MILP.

31. The computer-executable program product of claim 30, wherein the patrolling domain comprises infrastructure to be protected.

32. The computer-executable program product of claim 30, wherein the patrolling domain comprises one or more airport terminals to be protected.

33. A computer system comprising:
a processor configured to:
  determine a leader's strategy for a security domain according to a Stackelberg game;
  formulate a leader's policy;
  formulate an optimization problem the follower solves to find its optimal response to the leader's policy;
  maximize the payoff of the leader, given that the follower uses an optimal response that is function of the leader's policy, and formulating the problem as mixed-integer quadratic problem (MIQP);
  performing a decomposition of the MIQP to produce a decomposed MIQP, wherein the decomposition addresses the size of the MIQP;
  reformulate the leader payoff problem by linearizing the decomposed MIQP to form a decomposed mixed-integer linear program (MILP);
  solve the decomposed MILP; and
  direct a patrolling strategy of an agent within the security domain based on the solved decomposed MILP.

34. The system of claim 33, wherein the processor is configured and arranged to direct a patrolling route of a robot or an unmanned aerial vehicle (UAV) in the security domain.

* * * * *